(12) United States Patent
Edwards

(10) Patent No.: US 6,269,559 B1
(45) Date of Patent: Aug. 7, 2001

(54) MULCHING UNIT FOR USE IN MULCHING APPARATUS

(76) Inventor: John W Edwards, 7269 Bee Ridge Rd., Sarasota, FL (US) 34241

( * ) Notice: Subject to any disclaimer, the term of this patent is extended or adjusted under 35 U.S.C. 154(b) by 0 days.

(21) Appl. No.: 09/334,953

(22) Filed: Jun. 17, 1999

(51) Int. Cl.⁷ .................................................. E21B 25/06

(52) U.S. Cl. ........................................ 37/302; 144/24.12

(58) Field of Search ................................... 111/144, 145, 111/102; 37/302, 301, 303; 172/21, 22, 35, 118, 122, 123; 144/24.12

(56) References Cited

U.S. PATENT DOCUMENTS

| | | | | |
|---|---|---|---|---|
| 4,041,996 | * | 8/1977 | Grover | 37/302 X |
| 4,974,649 | * | 12/1990 | Manning | 37/302 X |
| 5,813,792 | | 9/1998 | Edwards | 403/322 |
| 5,975,644 | * | 11/1999 | Lang | 37/302 X |

OTHER PUBLICATIONS

Brochure entitled "The Mulcher" by Magnum Mulching Mowers, Inc. Applicant's understanding is that the subject matter in this brochure was in the public domain more than one year before the filing date of this application, Date unknown.

Construction Tools by Kennametal. Applicant's understanding is that the subject matter of this brochure was in the public domain more than one year before the filing date of this application, Date unknown.

Little Industries, Brochure (no date, but considered prior art as to this application).

Menzi U.S.A. Sales, Inc., Brochure (no date, but considered prior art as to this application).

Attachments Unlimited, Brochure(no date, but considered prior art as to this application).

Rayco T275 Site Preparation, Brochure (no date, but considered prior art as to this application).

Carlson Tractor & Equip. Co., Brush Cutting Equipment Brochure—Seppi Flail Mower (no date, but considered prior art as to this application).

Fecon Resource Recovery Equipment & Systems, Bull Hog–Brochure, (no date, but considered prior art as to this application).

Geo–Boy Brush cutter Tractor with a Seppi M. Forrest 225 Cutter Head Brochure, (no date, but considered prior art as to this application).

John Brown & Sons, Inc., the Brown Brontosaurus Brochure, (no date, but considered prior art as to this application).

(List continued on next page.)

Primary Examiner—Christopher J. Novosad
(74) Attorney, Agent, or Firm—Oliff & Berridge, PLC

(57) ABSTRACT

A mulching unit for a mulching apparatus includes at least one cutting assembly having a rotatable support element and at least one cutting element releasably mounted and movable or rotatable with respect to the support element. With this structure, it is possible to easily replace cutting elements without also replacing the corresponding support structure as well. In addition, the mulching unit may include a tubular assembly including inner and outer tube members connected using bracing members. A plurality of support elements of associated cutting assemblies may be fixedly attached to an outer surface of the outer tube member. This structure has improved resistance to impact with obstacles during the mulching operation that would otherwise cause misalignment.

35 Claims, 10 Drawing Sheets

OTHER PUBLICATIONS

Forestry–Agricultural Equipment, Forrestry Mower Medium Brochure, (no date, but considered prior art as to this application).

Rowmec Equipment Co., "T7 Rowmec R.O.W. King—Land Clearing Machine", Nov. 1999, Heavy Equipment News Publication.

Brown Bear FS 4000 Forestry Shredder Tractor, Brochure (no date, but considered prior art as to this application).

Coneqtec Universal, Brochure (no date, but considered prior art as to this application).

Asphalt Zipper Company, "The Asphalt Zipper", Nov. 1999, Heavy Equipment News Advertisement.

Berthelotp, Eric, "Gyro–Trac Introduces its New GT–18 XP", Apr. 1999, Messek publication.

R.F. Shinn Contractor, Inc., Shinn Cutter Systems Brochure (no date, but considered prior art as to this application).

Rowmec, TS R.O.W. King—Land Clearing Machine Brochure (no date, but considered prior art as to this application).

Alamo Industrial, Brochure (no date, but considered prior art as to this application).

* cited by examiner

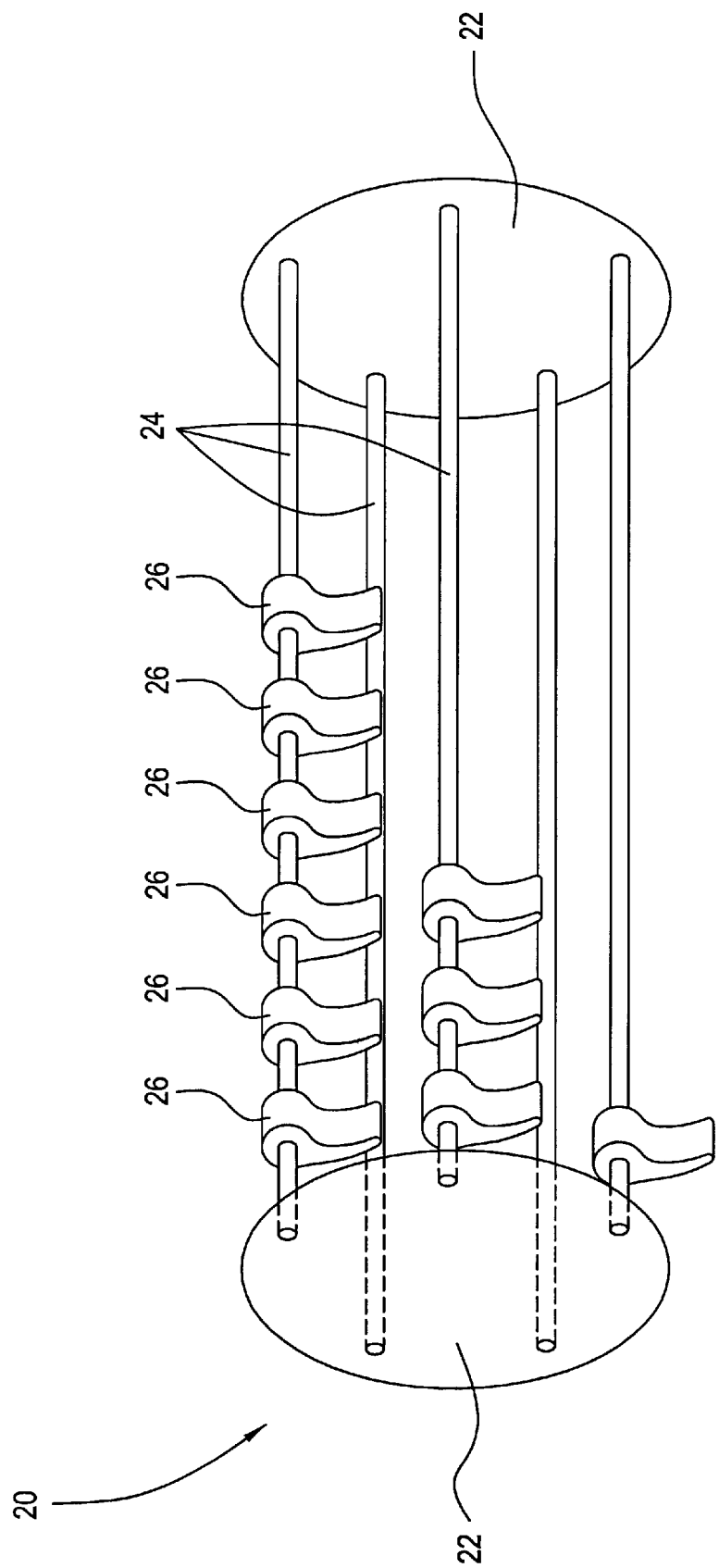

MULCHING UNIT FOR USE IN MULCHING APPARATUS

BACKGROUND OF THE INVENTION

1. Field of Invention

This invention relates to an industrial mulching apparatus for use in mulching vegetation such as brush, trees, etc., or stump grinding. In particular, this invention relates to improvements to a mulching unit including a plurality of cutting assemblies that serially engage and mulch the intended vegetation in rapid fashion.

2. Description of Related Art

FIGS. 1–4C show a related art mulching apparatus 10. The mulching apparatus 10 includes a tractor 12 supported on a set of wheels 14. The tractor driver can sit within a protected cage 16 positioned on a frame of the mulching apparatus 10. A hydraulic unit 18 connected to the tractor 12 provides a means by which a mulching unit 20 is positioned, e.g., laterally shifted, raised and lowered. The tractor 12 is commercially available from Barco, a manufacturer of tractors. Also, many details of the mulching apparatus 10 shown in FIG. 1 are described in U.S. Pat. No. 5,813,792 herein incorporated by reference in its entirety.

The tractor 12 is provided with one or more power sources, e.g., motors, sufficient to drive the tractor at a desired speed and to rotate the mulching unit 20 in the direction of arrow A. The mulching unit 20 can rotate at a speed of about 1,700 rpm, for example. The mulching unit 20 includes a plurality of cutting hammers 26 that are axially spaced along the length of the mulching unit 20. A plurality of spacers 27 are provided between each of the cutting hammers 26. The spacers 27 define sector shaped portions in which each of the hammers 26 pivots over a limited range. Movement within the sector shaped portion is in addition to the overall rotation of the mulching unit 20 in the direction of arrow A shown in FIG. 1. Centrifugal force causes each of the cutting hammers 26 to pivot radially beyond the limits of each spacer 27 to thereby engage brush, trees or other vegetation.

FIG. 2 is an enlarged view of the mulching unit 20. The cutting hammers 26 alternate with the spacers 27, and the hammers 26 pivot within each sector shaped portion defined by the spacers 27. The hammers 26 in one row are staggered with respect to the hammers 26 in adjacent rows to obtain a substantially continuous cutting profile.

FIG. 3 schematically shows the mulching unit 20 to include a pair of end plates 22 and a plurality of support rods 24. Each support rod 24 includes a plurality of cutting hammers 26. For example, each support rod 24 holds 10 to 12 cutting hammers 26. The cutting hammers 26 are freely rotatable about the support rods 24, and are sometimes referred to as "flail" mulchers or mowers.

FIG. 4A shows an enlarged view of the cutting hammer 26. In FIG. 4A, the cutting hammer 26 includes a through hole 28 defining an inner support surface that is slidably and rotatably mounted on one of the support rods 24 shown in FIG. 3. The through hole 28 is partly defined by a collar 30 on which a cutting element 32 is formed. In operation, a distal end portion of the cutting element 32 wears away or erodes due to repetitive high speed impact with vegetation, the ground, etc. As such, it is necessary to replace the cutting element 32, which also requires replacement of the collar 30 since it is formed in one piece with the cutting element 32. Generally, this is done by disassembling one or both of the end plates 22 from the support rods 24, as shown in FIG. 3, and then sliding the collar 30 until the cutting hammer 26 disengages with the support rod 24. In this manner, one or more of the spent cutting hammers 26 can be replaced with new cutting hammers 26.

FIG. 4B shows another example of a related art cutting hammer 26' that is similar to the cutting hammer 26 shown in FIG. 4A. The main difference is that the cutting hammer 26' is double-ended and includes first and second cutting elements 32A and 32B. Thus, when one of the cutting elements 32A is spent, one or both of the end plates 22 (FIG. 3) can be detached from the support rods 24, and the cutting hammer 26' can be removed from the support rod 24 and reassembled in an opposite orientation such that the fresh or unspent cutting element 32A, rather than the spent cutting element 32B, engages with the intended vegetation. Otherwise, the cutting hammers 26 and 26' are identical in operation.

FIG. 4C is representative of a right side elevation view of either of the cutting hammers 26 or 26'. The cutting elements 32 and 32B (as well as the cutting element 32A) are generally flat and blade-like and are roughly equal in width to the width of the collars 30, 30'. This is disadvantageous because the flat and blade-like shape of the cutting elements 32 and 32B results in excessive frictional contact with the intended vegetation or the ground during the mulching operation. In particular, any dirt or other debris that comes in contact with the blade member must be directed completely around each cutting element 30 or 32', which causes undue strain on the motor or power source of the tractor 12.

Another disadvantage with the related art structure shown in FIG. 1 is that the mulching unit can become misaligned if the mulching unit impacts various obstacles during operation. For example, the assembly of the end plates 22 and support rods 24 may not sufficiently resist deformation when impacting obstacles during the mulching operation.

Another related art mulching apparatus includes a rotatable drum having bullet-like cutting elements fixedly attached to the outer surface of the drum. These cutting elements are made from tungsten or carbide and are commonly used in asphalt grinding machines. However, deformation of the drum unit is problematic because it has a relatively fragile structure not well suited to resisting impact.

SUMMARY OF THE INVENTION

One aspect of the invention relates to providing a mulching apparatus including a mulching unit and/or cutting assembly with improved cutting efficiency and cost-effectiveness for labor and/or replacement parts. Another aspect of the invention relates to retrofitting mulching units of the related art with a new and improved cutting assembly that improves cutting efficiency and cost-effectiveness for labor and/or replacement parts. Another aspect of the invention concerns reducing the amount of labor required to replace spent parts. Yet another aspect of the invention relates to improving resistance to misalignment due to impact with obstacles during the mulching operation.

According to one preferred embodiment of the present invention, a mulching apparatus comprises a tractor and a mulching unit coupled to and receiving power from the tractor. The mulching unit includes at least one cutting assembly having a rotatable support element and at least one cutting element releasably mounted to the support element.

In other preferred embodiments, each support element may include a base member and a cutting element holder member integrally formed with the base member. The base member may be a collar slidable over a support rod of the mulching unit. Furthermore, the at least one cutting element may comprise two cutting elements, and the holder member may include at least two through holes, each of the at least two through holes rotatably supporting one of the two cutting elements. The at least two cutting elements may be offset from one another so that they impact the intended vegetation in stepwise fashion.

Preferred embodiments of the invention include several different mulching units. One version of the mulching unit may include a plurality of rows of support rods, and the cutting element on one of the support rods may be offset or staggered from the cutting element on another one of the support rods. Another version of the mulching unit includes a rotating tube assembly having an outer tube member and an inner tube member. The inner tube member is coupled to a drive shaft of the mulching unit, and the outer tube member fixedly mounts the support element of the cutting assembly on an outer surface of the outer tube member. A plurality of bracing rings axially spaced along the drive shaft may connect the inner and outer tube members.

The cutting element may also take on a number of different configurations according to preferred embodiments of the present invention. In one embodiment, the cutting element may include a shank having a first end having a shaped cutting tip and second end opposite the first end having a fastener. The shaped cutting tip may have many different shapes configured according to the particular cutting needs. For example, the shaped cutting tip may be tapered, symmetrical, square or triangular in cross-section. In preferred embodiments, the shaped cutting tip may be made from tungsten, carbide or another suitably hard material that is resistant to wear and abrasion. In preferred embodiments, the first and second ends of the cutting element may include first and second shaped cutting tips, which may or may not have the same shape. In this connection, the invention also contemplates the use of a quick release mechanism so that each cutting element can be quickly replaced with a new cutting element or reversed to utilize the unused end of the cutting element. Of course, regardless of what version of mulching unit is utilized, it is not necessary to remove, replace or discard the support element from the mulching unit in order to replace or reverse the orientation of the cutting element.

According to yet another aspect of the present invention, a mulching apparatus comprises a tractor having a power source, and a mulching unit connected to the power source. The mulching unit includes a rotating tube assembly having inner and outer tube members, the inner tube member being coupled to a drive shaft of the power source and the outer tube including at least one cutting assembly. The cutting assembly includes a support element fixedly connected to the outer tube and at least one cutting element freely supported on and removable from the support element. In preferred embodiments, the at least one cutting element comprises at least two cutting elements that are spaced apart to define a predetermined gap therebetween. This gap allows dirt and other debris to freely flow between the two cutting elements during the mulching operation, which reduces the frictional resistance from each cutting assembly applied to the power source. In addition, each of the cutting elements may be made rotatable within the support element to further reduce frictional losses.

These and other aspects of the invention will be described in or apparent from the following detailed description of preferred embodiments.

BRIEF DESCRIPTION OF THE DRAWINGS

Preferred embodiments of the present invention will be described in conjunction with the following drawings, in which like reference numbers refer to like parts, and wherein:

FIG. 3 is a schematic view of the mulching unit shown in FIG. 1 and 2;

DETAILED DESCRIPTION OF PREFERRED EMBODIMENTS

Figure 5:
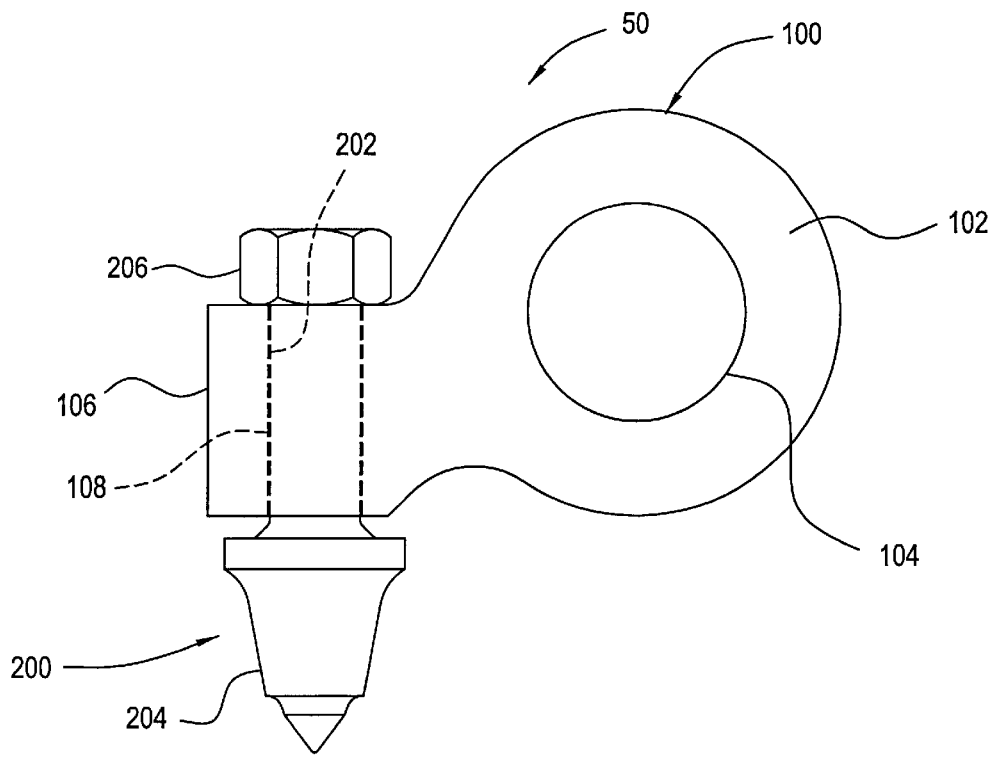
FIG. 5 shows a cutting assembly according to a preferred embodiment of the present invention.
Figure 6:
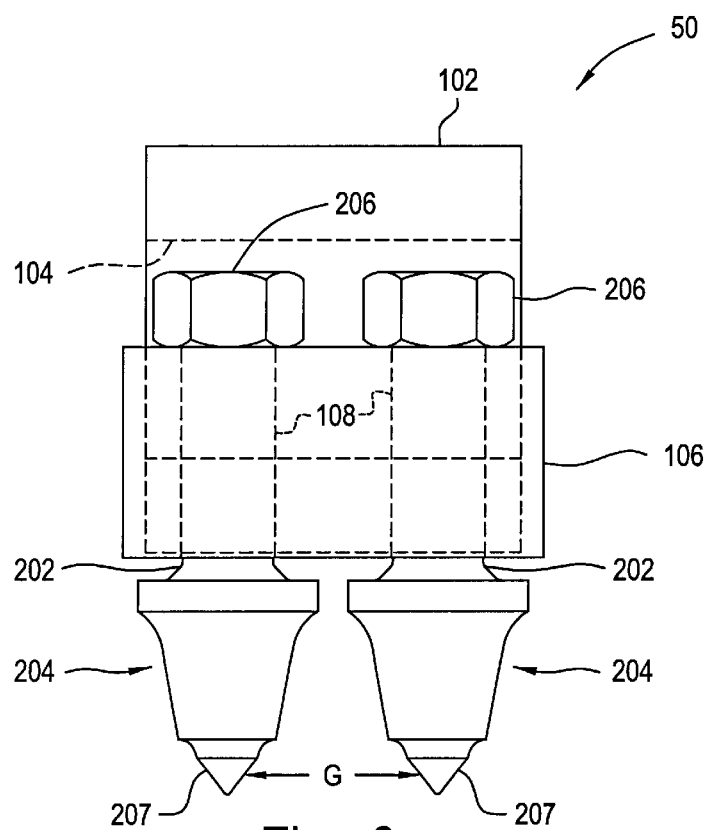
FIG. 6 is a left side elevation view of the cutting assembly shown in FIG. 5.
Figure 7:
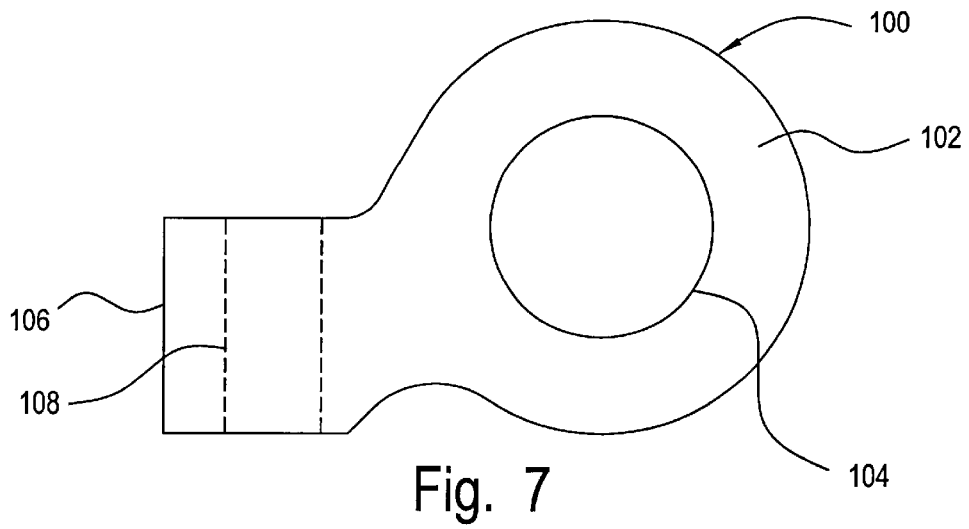
FIG. 7 illustrates the support element shown in FIG. 5, without the cutting element.
Figure 8:
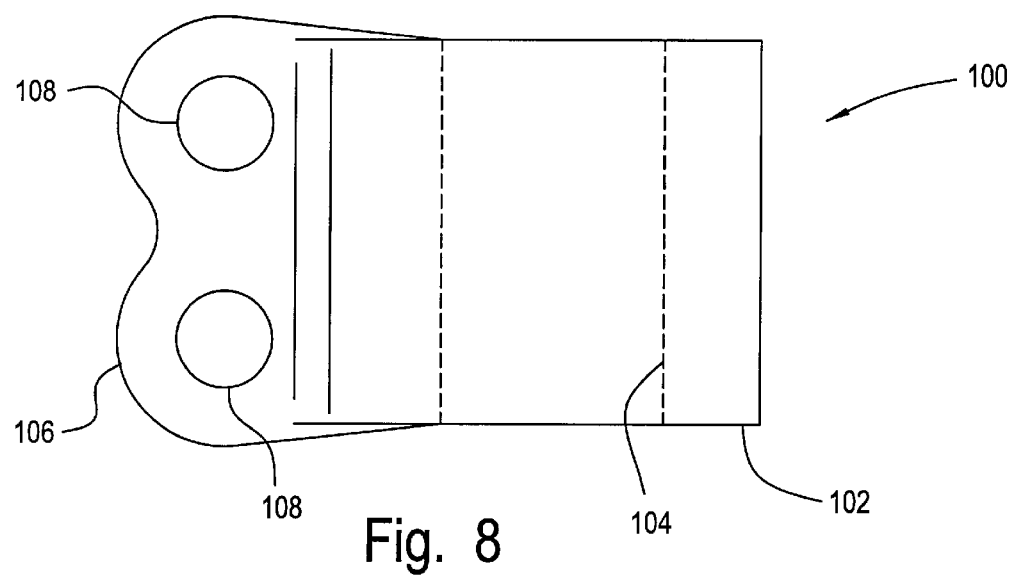
FIG. 8 is a top elevation view of the support element shown in FIG. 7.
Figure 8A:
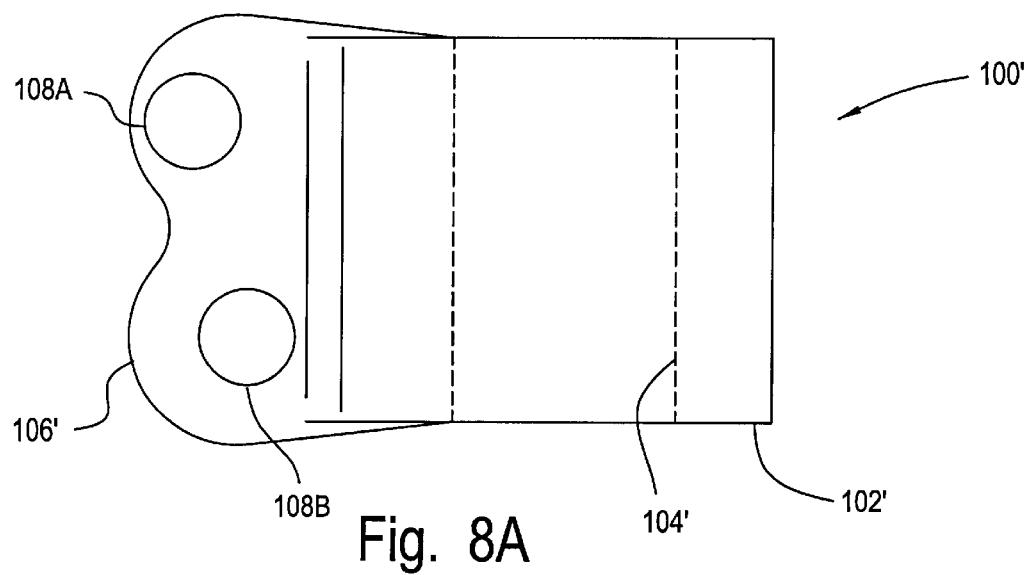
FIG. 8A illustrates an alternative preferred embodiment of a support element according to the present invention.
Figure 9C:
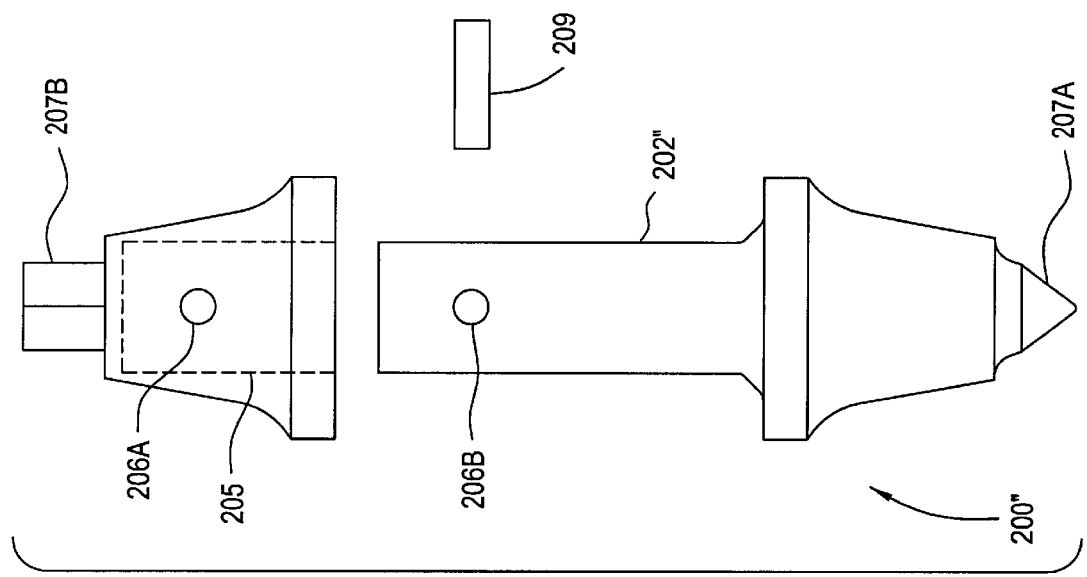
FIG. 9C illustrates yet another preferred embodiment of a cutting element and fastener according to the present invention.
Figure 9B:
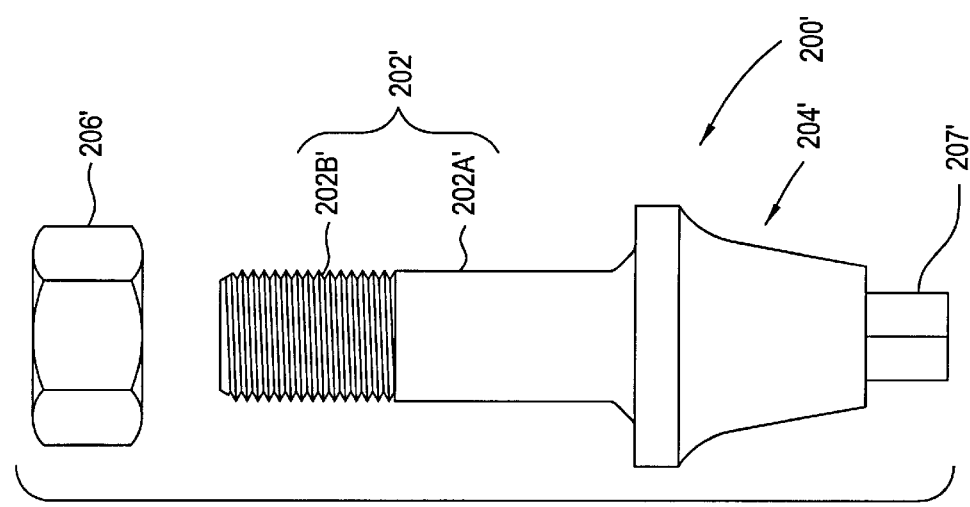
FIG. 9B illustrates a cutting element and fastener according to another preferred embodiment of the present invention.
Figure 9A:
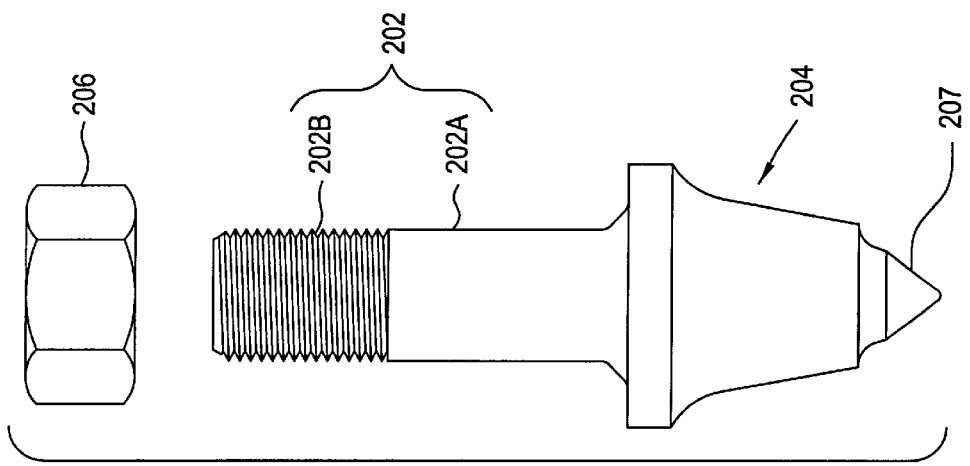
FIG. 9A illustrates a cutting element and fastener according to a preferred embodiment of the present invention.

FIGS. 5 and 6 illustrate a cutting assembly 50 including a support element 100 and a cutting element 200. FIGS. 7, 8 and 8A illustrate the support element 100 without the cutting element, and FIGS. 9A–9C illustrate various embodiments of the cutting element 200, 200', 200" without the support element.

With reference to FIG. 5, the support element 100 includes a base member in the form of a collar 102 that defines a through hole having an inner support surface 104. The inner support surface 104 is slidably and rotatably mounted one of a plurality of support rods 24 (shown in FIG. 3). Approximately 10 to 12 support elements 100 (weighing 8–10 lbs. each) are provided on each support rod 24. The collar 102 is integrally coupled to a cutting element holder member 106. The collar 102 and holder member 106 may be welded together, or they may be cast of molten metal in a single mold and formed as a single piece. The holder member 106 includes at least one through hole 108.

Figure 1:
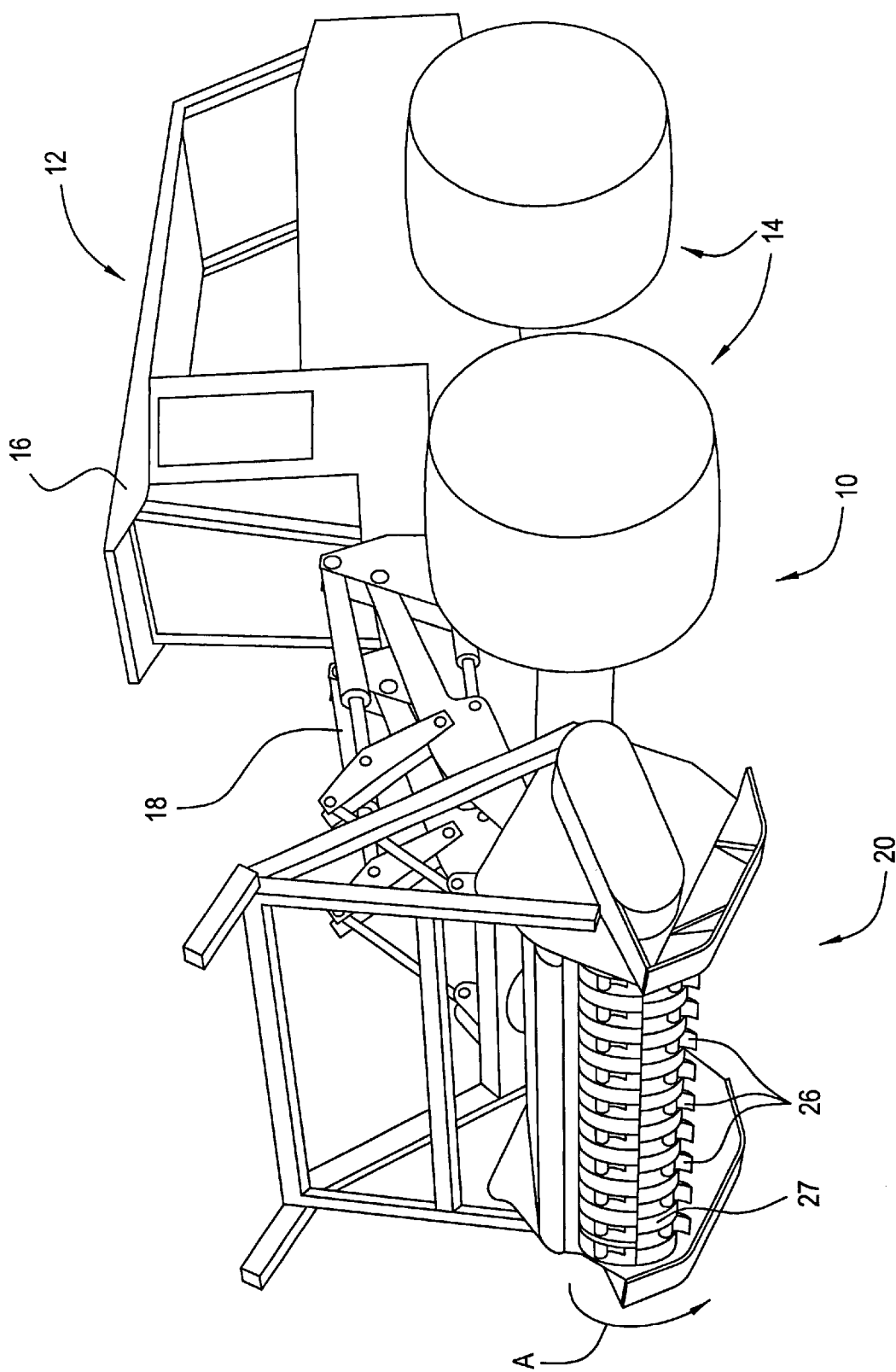
FIG. 1 illustrates a mulching apparatus according to the related art.
Figure 2:
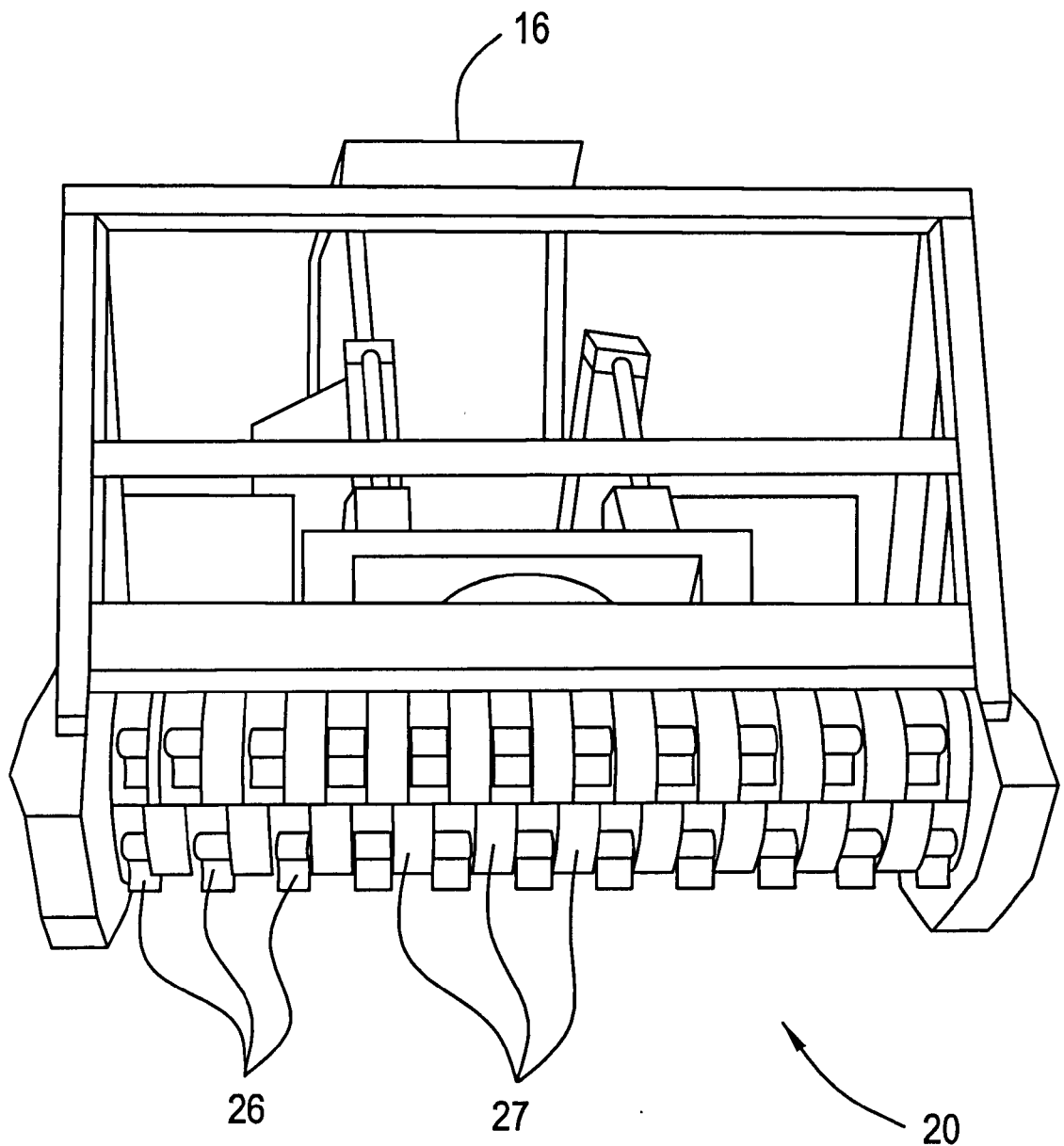
FIG. 2 is an enlarged view of the mulching unit shown in FIG. 1.
Figure 4A:
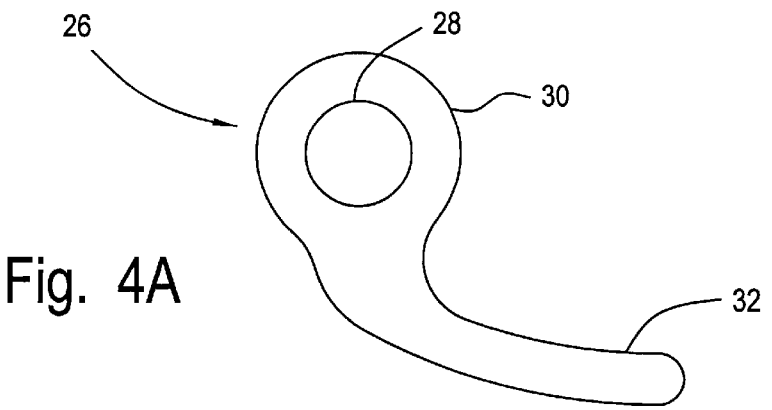
FIG. 4A shows a first embodiment of a cutting hammer according to the related art.
Figure 4B:
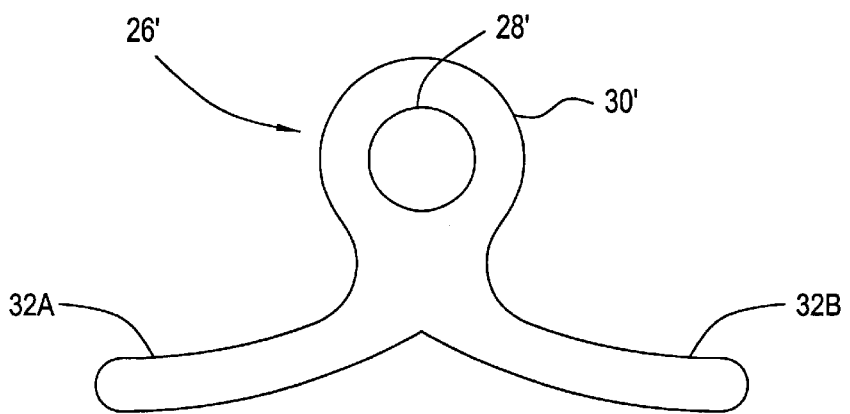
FIG. 4B shows a second embodiment of a cutting hammer according to the related art.
Figure 4C:
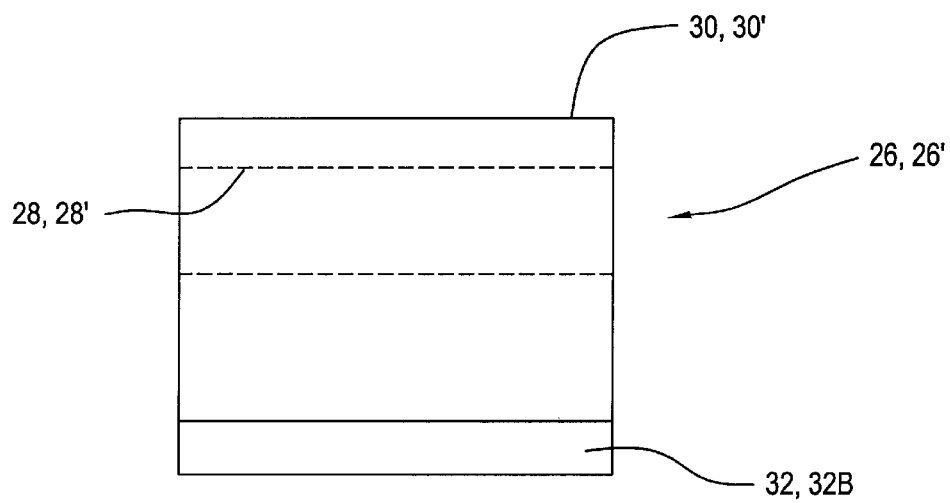
FIG. 4C shows a right side elevation view of the cutting hammer shown in FIGS. 4A or 4B.

As shown in FIG. 6, for example, the holder member 106 includes two through holes 108. Each through hole 108 is intended to releasably and/or rotatably receive one of the cutting elements 200. A gap G is formed between two cutting members 204 of the cutting elements 200. Each cutting member 204 includes a shaped cutting tip 207. The gap G is beneficial because it allows dirt and other debris to flow between the cutting elements 200, as distinguished from the blade like cutting hammer 26 shown in related art FIGS. 4A–4C. It is also beneficial to allow the cutting elements 200 to rotate within the through holes 108 to further facilitate movement of the debris past and between the cutting members 204. The cutting assembly 50 allows a 30% reduction in the amount of time required for mulching vegetation, e.g., large trees having a diameter of 24"–36" or larger, as compared to the cutting blades 26 of the related art.

Each cutting element 200 includes a shaft 202 defining first and second ends. The first end of the shaft 202 includes the shaped cutting tip 207, which is preferably made of a hard material such as tungsten and/or carbide which is resistant to abrasion and frictional contact. The shaped cutting tip 207 should also be resistant to impact as well. A second end of the shaft 200 includes a fastening element, such as a nut 206, that is threaded onto a threaded portion 202A of the shaft 202 (FIG. 9A). It is not necessary to thread the entire length of the shaft 202—a portion 202B of the shaft 202 may remain smooth and unthreaded, as shown in FIG. 9A. The cutting element 200 is releasably mounted to the support element and therefore can be easily replaced without requiring replacement of the support element 100 or undue labor.

FIG. 7 illustrates the support element 100 shown in FIG. 5, but the cutting element has been removed for clarity of illustration. FIG. 8 is a top elevation view of the support element 100 shown in FIG. 6 with the cutting element removed.

FIG. 8A is an alternative preferred embodiment of a support element 100' according to another preferred embodiment of the invention. In FIG. 8A, the support element 100' includes first and second through holes 108A and 108B. The through hole 108A is offset from the through hole 108B such that the a cutting element positioned within the through hole 108A contacts the vegetation slightly before the cutting element positioned within the through hole 108B contacts the same vegetation. In this manner, energy drain to the power source of the tractor can be stepwise applied, which reduces shock to the energy source. Thus, the mulching unit 20 can run smoothly and with less interruption required to power up to the proper rpm.

FIG. 9A shows the cutting element 200 shown in FIGS. 5 and 6. In FIG. 9A, the nut 206 is threadably attached to the threaded portion 202A of the shaft 202 of the cutting element 200. In an arrangement not shown, a standard bolt can be used if the cutting member 204 is suitably threaded. To reduce the possibility of the nut 206 becoming detached from the threaded portion 202 during high speed operation, it is also possible to additionally tack weld the nut 206 onto the shaft 202. Alternatively, the nut 206 can be replaced with a locking nut or a locking pin arrangement, so that the cutting elements 200 can be easily replaced. The cutting element 200 shown in FIG. 9A is the type commercially available for use in an asphalt grinding machine.

FIG. 9B shows an alternative embodiment of a cutting element 200' according to the present invention. The cutting element 200' shown in FIG. 9B is similar to the cutting element shown in FIG. 9A, but includes a square ended shaped cutting tip 207' that is particularly useful for cutting vegetation. The cutting tip could also have other polygonal or symmetrical cross sections, such as triangles, hexagons, etc.

FIG. 9C shows yet another embodiment of the present invention. The cutting element 200" includes first and second shaped cutting tips 207A and 207B. The first shaped cutting tip 207A may be similar to the shaped cutting tip 207 shown in FIG. 9A, while the second shaped cutting tip 207B may be similar to the shaped cutting tip 207' shown in FIG. 9B. The second shaped cutting tip 207B may include a threaded assembly (not shown) which is threaded onto the shank 202", like the nut 206 or 206' in FIGS. 9A and 9B, respectively, or an alternative fastening mechanism can be used, such as a quick release mechanism that facilitates removal or reversal of the cutting element 200". For example, the second shaped cutting tip 207B may include a blind bore 205 that can receive the shaft 202". When a hole 206A on the shaped cutting tip 207BA aligns with a hole 206B formed on the shank 202", a separate pin member 209 can be inserted into both holes 206A and 206B, thus forming a mechanical lock. Additionally, the holes 206A and 206B can also coincide with another hole (not shown) formed in the holder member 106, 106' of the support element 100, 100'. Also, although different shaped cutting tips are shown in FIG. 9C, the shaped cutting tips 207A and 207B may also be identical.

The use of the cutting elements 200, 200' or 200", especially if used in conjunction with the support element 100' of FIG. 8A, can enable significant improvements in cutting speed as well as the ability to cut large trees up to 24"–36" in diameter or larger.

Figure 10:
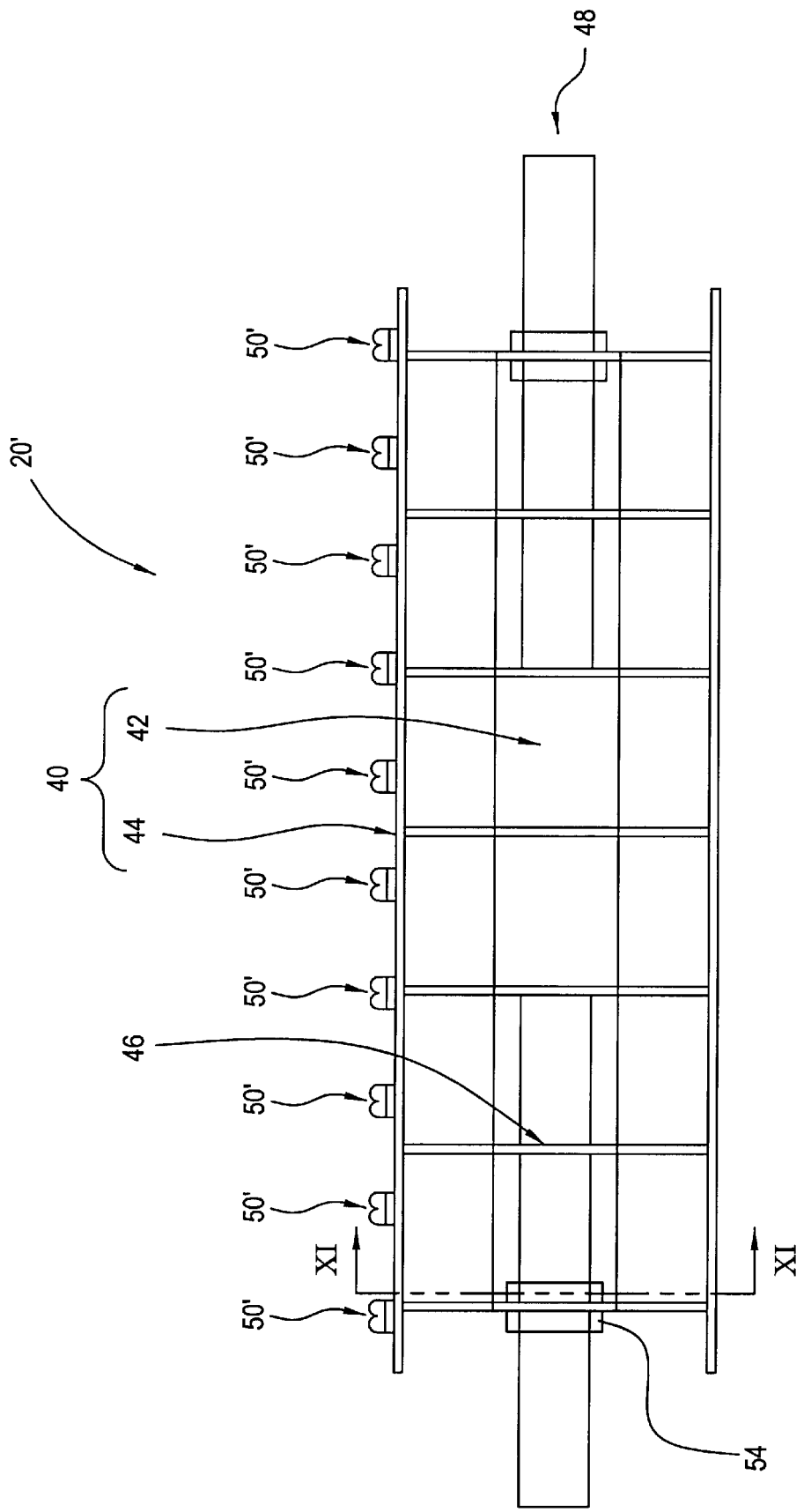
FIGS. 10–12 illustrate yet another preferred embodiment of a mulching unit according to the present invention.
Figure 11:
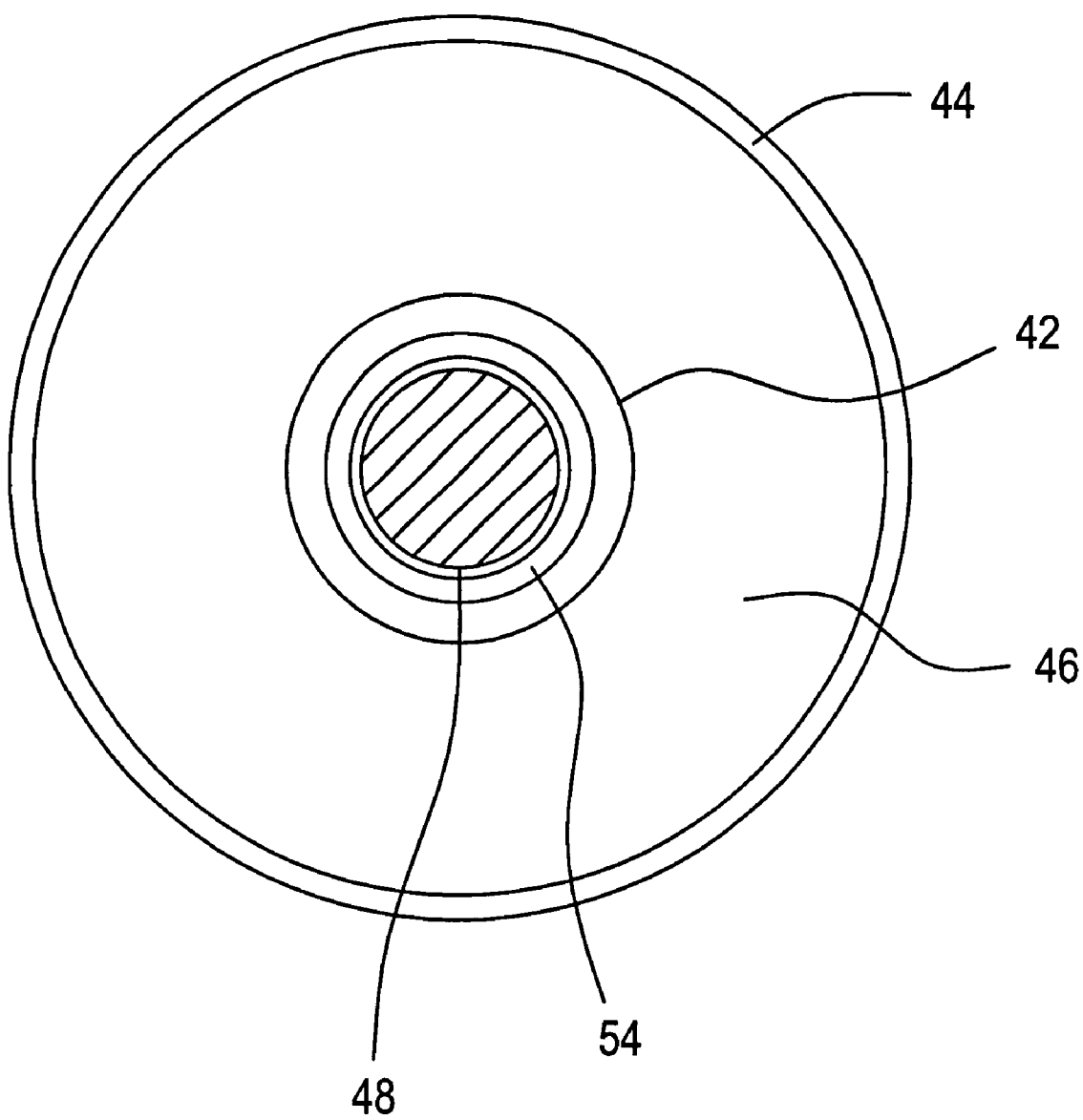
Figure 12:
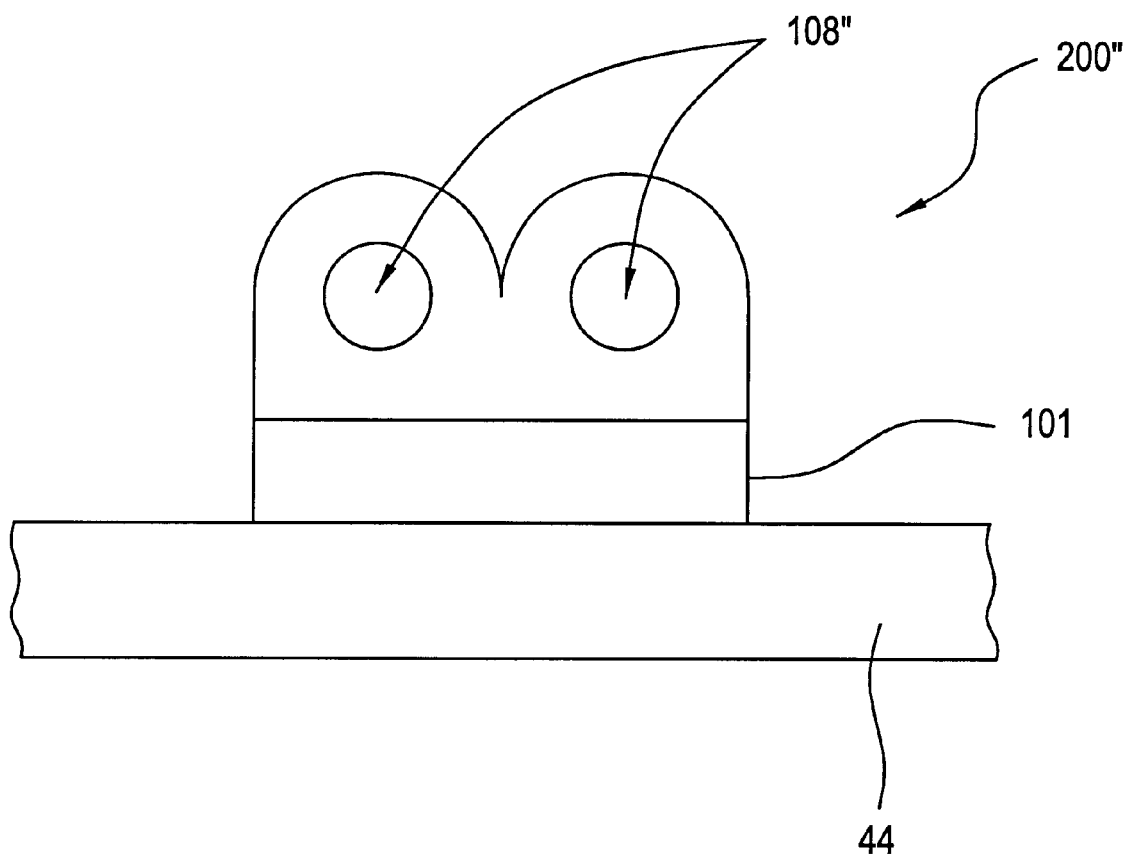

FIGS. 10–12 show an alternative embodiment of a mulching unit 20'. The mulching unit 20' includes a rotating tube assembly 40 including an inner tube member 42 and an outer tube member 44. The inner tube member 42 passes through a series of bracing rings 46 connecting the inner and outer tube members 42 and 44. The bracing rings 46 help improve the structural integrity of the mulching unit 20'. The relationship between the inner and outer tube members 42 and 44 and the bracing rings 46 is shown in FIG. 11, which is a cross-sectional view along section XI—XI of FIG. 10. A shaft 48 is supplied with power from a power source for the mulching unit 20'. A bushing 54 is interposed between the shaft 48 and at least the outermost bracing rings 46.

The outer tube member 44 includes a plurality of rows of cutting assemblies 50'. In the example shown, each row includes about 12 cutting assemblies 50'. In addition, although not shown in FIG. 10, the cutting elements in one row are staggered from the cutting elements in the adjacent rows so that a substantially continuous cutting profile can be formed as the mulching unit 20' is rotated.

Each cutting assembly 50' is fixedly mounted on an outer surface of the outer tube member 44. As such, each cutting assembly 50' is not mounted on a support rod 24, as shown in FIG. 3. Rather, the support element 100' includes a base member in the form of a substantially flat or slightly curved plate member 101 that is fixedly mounted onto the outer surface of the outer tube member 44. The plate member 101 can be welded or otherwise bolted to the outer tube member 44. In FIG. 12, the cutting elements are not shown for clarity, but can be similar to those shown in FIGS. 9A–9C. Although the through holes 108" are shown as being uniformly spaced from the outer surface of the outer tube member 44, they also may be offset in the manner shown in FIG. 8A.

The structure shown in FIGS. 10–12 is advantageous since there is no requirement to form a collar or to assemble the collar onto the support rod 24, as in the embodiments of FIGS. 5–8A. Also, like the earlier described embodiments, it is not necessary to remove the base member (plate member 101) from the mulching unit 20' to replace the cutting elements. The double walled tube assembly 40 also improves resistance to warping or bending when the mulching unit 20' encounters obstacles that tend to bend or otherwise warp the mulching unit 20'.

While the invention has been described in conjunction with preferred embodiments thereof, it is evident that many alternatives, modifications and variations may be apparent to those skilled in the art. For example, while the cutting assemblies according to the preferred embodiments described are shown to include two cutting elements, the present invention also contemplates cutting assemblies including a single removable cutting element. In addition, while the shafts of the cutting elements preferably include a circular cross section, which allows rotation of the cutting elements within the holder members of the support elements, the shafts may also be of a non-circular cross section that allows the cutting elements to reciprocate but not rotate. Accordingly, preferred embodiments of the invention as set forth herein are intended to be illustrative, not limiting. Various changes may be made without departing from the spirit and scope of the preferred illustrated embodiments.

What is claimed is:

1. A mulching apparatus comprising:
   a tractor; and
   a mulching unit coupled to and receiving power from the tractor, the mulching unit including at least one cutting assembly having a freely rotatable support element and at least one cutting element releasably mounted to the support element.

2. The mulching apparatus of claim 1, wherein each support element includes a base member and a cutting element holder member integrally formed with the base member.

3. The mulching apparatus of claim 2, wherein the base member comprise a collar.

4. The mulching apparatus of claim 2, wherein the at least one cutting element comprises two cutting elements, and the holder member includes at least two through holes, each of the two through holes rotatably supporting one of the two cutting elements.

5. The mulching apparatus of claim 4, wherein a first one of the two through holes is offset from a second one of the two through holes such that the two cutting elements contact a cutting surface in stepwise fashion.

6. The mulching unit of claim 1, wherein the mulching unit includes first and second end plates connected by at least one support rod.

7. The mulching apparatus of claim 6, wherein the support element includes a collar freely rotatable on the at least one support rod.

8. The mulching apparatus of claim 7, wherein the at least one support rod includes a plurality of support rods each supporting at least one of said at least one cutting element, and the least one cutting element on one of the support rods is staggered with respect to the at least one cutting element on a different one of the support rods.

9. The mulching apparatus of claim 1, wherein the at least one cutting element comprises two cutting elements that are spaced apart to define a predetermined gap.

10. The mulching apparatus of claim 9, wherein the two cutting elements are freely rotatable with respect to the support element.

11. The mulching apparatus of claim 1, wherein the at least one cutting element includes a shank having a first end including a first shaped cutting tip and a second end, opposite the first end, having a fastener.

12. The mulching apparatus of claim 11, wherein the first shaped cutting tip is tapered.

13. The mulching apparatus of claim 11, wherein the first shaped cutting tip is noncircular in cross-section.

14. The mulching apparatus of claim 11, wherein the second end of the cutting element includes a second shaped cutting tip.

15. The mulching apparatus of claim 14, wherein the second shaped cutting tip has a different configuration than the first shaped cutting tip.

16. The mulching apparatus of claim 11, wherein the first shaped cutting tip is made from at least one of tungsten and carbide.

17. The mulching apparatus of claim 1, wherein the support element has a collar defining an inner surface rotatably and slidably mounted to a support rod of the mulching unit, and a cutting element holder member integrally formed with the collar, the holder member including at least first and second through holes; and
   wherein the at least one cutting element comprises at least first and second cutting elements releasably mounted within the first and second through holes, respectively.

18. The mulching apparatus of claim 1, wherein the support element has a collar defining an inner surface rotatably and slidably mounted to a support rod of the mulching unit; and
   wherein the at least one cutting element comprises at least first and second cutting elements extending away from the collar and being spaced apart by a predetermined distance to define a gap therebetween.

19. The mulching apparatus according to claim 1, wherein the tractor has a power source;
   wherein the mulching unit includes a rotating tube assembly having inner and outer tube members, the inner tube member being connected to a drive shaft of the power source and the outer tube member including the at least one cutting assembly, the support element of the cutting assembly fixedly connected to the outer tube member; and
   wherein the at least one cutting assembly comprises at least one cutting assembly freely supported on and movable with respect to the support element.

20. A cutting assembly for use with a mulching unit of a mulching apparatus, comprising:
   a support element having a collar defining an inner surface rotatably and slidably mounted to a support rod of the mulching unit, and a cutting element holder member integrally formed with the collar, the holder member including at least first and second through holes; and
   at least first and second cutting elements releasably mounted within the first and second through holes, respectively.

21. The cutting assembly of claim 20, wherein the first and second through holes are offset so that the two cutting elements contact a cutting surface in stepwise fashion.

22. The cutting assembly of claim 20, wherein the first and second cutting elements are spaced to define a gap therebetween.

23. The cutting assembly of claim 20, wherein the first and second cutting elements include shaped cutting tips made from at least one of tungsten and carbide.

24. The cutting assembly of claim 20, wherein the first and second cutting elements have shaped cutting tips at each end thereof.

25. The cutting assembly of claim 20, wherein the first and second cutting elements are moveable and rotatable within the first and second through holes.

26. The cutting assembly of claim 20, further comprising a quick release mechanism for facilitating removal of the first and second cutting elements from the support element.

27. A mulching apparatus comprising:

a tractor having a power source; and a mulching unit in communication with the power source, the mulching unit including a rotating tube assembly having inner and outer tube members, the inner tube member being connected to a drive shaft of the power source and the outer tube member including at least one cutting assembly, the cutting assembly including a support element fixedly connected to the outer tube member and at least one cutting element freely supported on the support element so as to be movable with respect to the support element.

28. The mulching apparatus of claim 27, wherein the at least one cutting element comprises at least two cutting elements spaced from one another to define a gap therebetween, each of the two cutting elements being rotatable with respect to through holes formed in a holder member of the support element.

29. The mulching apparatus of claim 27, further comprising bracing elements connecting the inner and outer tube members.

30. A cutting assembly for use with a mulching unit comprising:

a support element having a collar defining an inner surface rotatably and slidably mounted to a support rod of the mulching unit; and at least first and second cutting elements extending away from the collar and being spaced apart by a predetermined distance to define a gap therebetween.

31. The cutting assembly according to claim 30, wherein the first and second cutting elements include shaped cutting tips made from at least one of tungsten and carbide.

32. The cutting assembly according to claim 30, wherein the first and second cutting elements include at least a portion made from at least one of tungsten and carbide.

33. The cutting assembly according to claim 30, wherein the first and second cutting elements are offset from one another so that the first and second cutting elements contact a cutting surface in stepwise fashion.

34. The cutting assembly of claim 30, wherein the first and second cutting elements are tapered.

35. The cutting assembly of claim 30, wherein the first and second cutting elements are non-circular in cross-section.

* * * * *